(12) United States Patent
Zhang

(10) Patent No.: US 11,894,982 B2
(45) Date of Patent: Feb. 6, 2024

(54) METHOD FOR EVALUATING NETWORK QUALITY, ELECTRONIC DEVICE AND STORAGE MEDIUM

(71) Applicant: ZTE CORPORATION, Guangdong (CN)

(72) Inventor: Xueqian Zhang, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 0 days.

(21) Appl. No.: 17/915,096

(22) PCT Filed: Jun. 17, 2021

(86) PCT No.: PCT/CN2021/100749
§ 371 (c)(1),
(2) Date: Sep. 27, 2022

(87) PCT Pub. No.: WO2022/001686
PCT Pub. Date: Jan. 6, 2022

(65) Prior Publication Data
US 2023/0188426 A1    Jun. 15, 2023

(30) Foreign Application Priority Data
Jun. 29, 2020  (CN) .......................... 202010606802.2

(51) Int. Cl.
*H04L 41/12*       (2022.01)
*H04L 41/0631*  (2022.01)
(52) U.S. Cl.
CPC .......... *H04L 41/12* (2013.01); *H04L 41/0631* (2013.01)
(58) Field of Classification Search
CPC .......................... H04L 43/0811; H04W 16/20
See application file for complete search history.

(56) References Cited

U.S. PATENT DOCUMENTS

2007/0291660 A1 * 12/2007 Robson ................. H04W 24/00
370/252
2009/0059814 A1 * 3/2009 Nixon ..................... H04L 41/12
370/254
(Continued)

FOREIGN PATENT DOCUMENTS

CN    106686612 A    5/2017

OTHER PUBLICATIONS

International search report of PCT Patent Application No. PCT/CN2021/100749 dated Aug. 31, 2021.

*Primary Examiner* — Thu V Nguyen
*Assistant Examiner* — James Ross Hollister
(74) *Attorney, Agent, or Firm* — HAUPTMAN HAM, LLP

(57) ABSTRACT

The embodiments of the present invention relate to the field of communication. Disclosed are a method for evaluating network quality, an electronic device, and a storage medium. The method for evaluating network quality of the present invention includes: generating a target network topology according to node information in a current network, the target network topology being a network topology structure in which a master node is directly connected to each sub node; determining a network transmission cost of the target network topology as a first network transmission cost and a network transmission cost of the actual network topology as a second network transmission cost according to the node information in the current network, the target network topology and an actual network topology of the current network; and determining a quality evaluation result of the current network according to the first network transmission cost and the second network transmission cost.

12 Claims, 9 Drawing Sheets

(56) References Cited

U.S. PATENT DOCUMENTS

| | | | |
|---|---|---|---|
| 2013/0191688 A1* | 7/2013 | Agarwal | H04L 41/0873 |
| | | | 714/E11.178 |
| 2017/0331694 A1* | 11/2017 | Crickett | H04L 41/0836 |
| 2018/0324607 A1* | 11/2018 | Rengarajan | H04W 24/02 |
| 2020/0396153 A1* | 12/2020 | Campora | H04L 45/04 |

* cited by examiner

METHOD FOR EVALUATING NETWORK QUALITY, ELECTRONIC DEVICE AND STORAGE MEDIUM

CROSS-REFERENCE TO RELATED APPLICATIONS

The present application claims the priority of Chinese patent application No. 202010606802.2 filed on Jun. 29, 2020, the contents of which are incorporated herein by reference in its entirety.

FIELD OF THE INVENTION

The present application relates to the field of communication, and in particular, to a method for evaluating network quality, an electronic device and a storage medium.

BACKGROUND OF THE INVENTION

A Mesh router is a product that can expand the coverage of wifi (Wireless Fidelity, Wireless Local Area Network), and may be used for full coverage of network in various scenarios, such as small office areas, homes, etc. Within the coverage of the Mesh router, a wifi terminal of a user may seamlessly switch among several routers, and the wifi terminal may select an optimal access location to achieve a better network rate. Generally, a Mesh network is a unified network established by a plurality of individual Mesh routers, in which the Mesh routers are placed in different rooms for coverage. Individual Mesh nodes are connected with each other through a wireless channel therebetween.

However, the overall performance of the Mesh network is related to the placement of the Mesh routers, but the user does not know how the overall network performance is, such that the obtained mesh network quality is poor, thereby affecting user experience.

SUMMARY OF THE INVENTION

The objective of the embodiments of the present application is to provide a method for evaluating network quality, an electronic device and a storage medium, such that the user may acquire the quality of a current network, thereby assisting the user to adjust the current network so as to enhance the quality of the network.

In an embodiment of the present application, a method for evaluating network quality is provided and includes: generating a target network topology according to node information in a current network, the target network topology being a network topology structure in which a master node is directly connected to each sub node; determining a network transmission cost of the target network topology as a first network transmission cost and a network transmission cost of the actual network topology as a second network transmission cost according to the node information in the current network, the target network topology and an actual network topology of the current network; and determining a quality evaluation result of the current network according to the first network transmission cost and the second network transmission cost.

In an embodiment of the present application, an electronic device is further provided and includes: at least one processor; and a memory in communication connection with the at least one processor. The memory stores instructions executable by the at least one processor, and the instructions are executed by the at least one processor to enable the at least one processor to perform the above described method for evaluating network quality.

In an embodiment of the present application, a computer-readable storage medium in which a computer program is stored is further provided, and when the computer program is executed by a processor, the above-described method for evaluating network quality is implemented.

BRIEF DESCRIPTION OF THE DRAWINGS

One or more embodiments are exemplarily illustrated by the pictures in the corresponding drawings, and the exemplified illustrations are not intended to limit the embodiments.

DETAILED DESCRIPTION OF THE EMBODIMENTS

In order to make the objectives, technical solutions and advantages of the embodiments of the present application more clear, various embodiments of the present application will be described in detail below with reference to the accompanying drawings. However, it should be understand by those skilled in the art that, in various embodiments of the present application, many technical details are provided for a reader to better understand the present application. However, even without these technical details and various changes and modifications based on the following various embodiments, the technical solutions as claimed in the present application may be realized. The divisions to the following various embodiments are intended for the convenience of description, and should not be construed to constitute any limitation on the specific implementations of the present application. The various embodiments may be combined with each other and refer to each other without contradiction.

Figure 1:
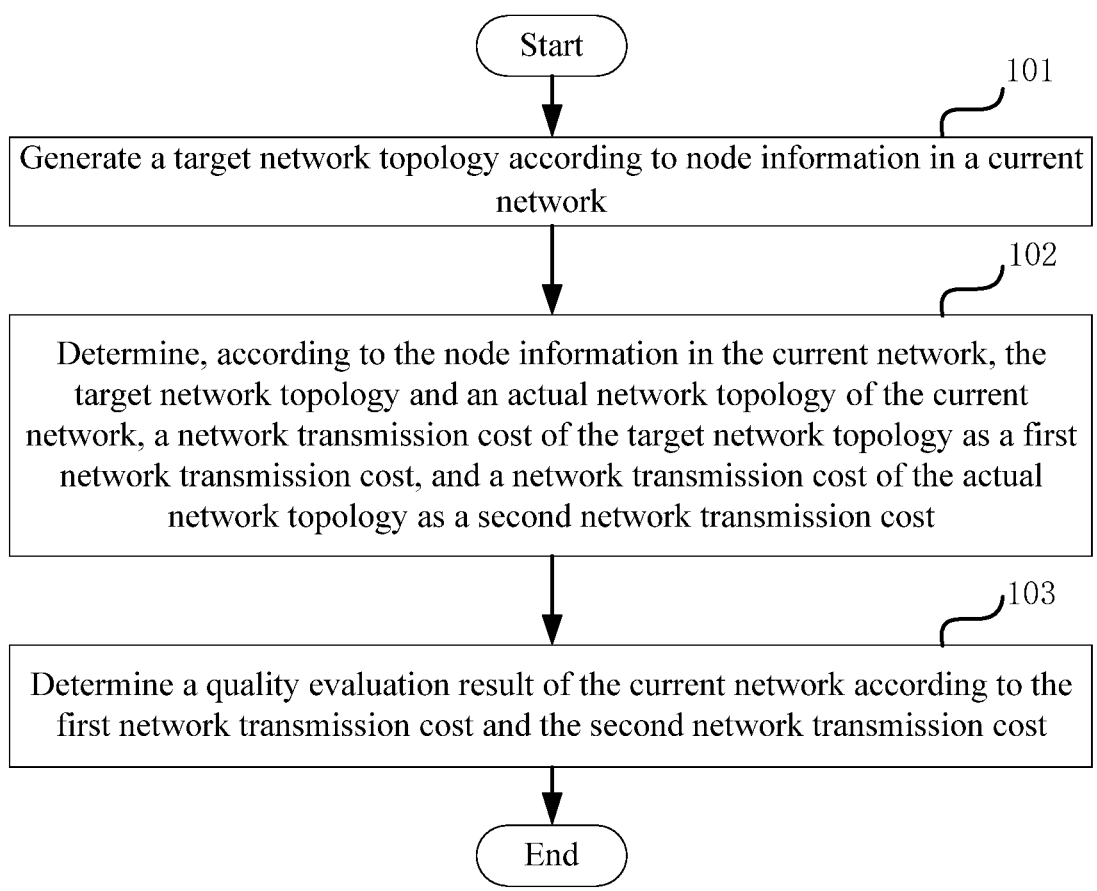
FIG. 1 is a flowchart of a method for evaluating network quality provided according to a first embodiment of the present application.

The inventor has found that individual nodes in a current Mesh network are connected with each other via a wireless channel Due to the characteristics of the wireless channel, the channel quality may be greatly affected by external environment. For example, both an orientation of an antenna and a obstruction of a building will affect the performance of a Mesh router (i.e., a Mesh node). Therefore, if a user places the Mesh node in an unsuitable position or adopts an unsuitable orientation, the network quality of an obtained Mesh network is inevitable very poor, which affects the user's usage of the network. However, at present, the user is only provided with a Mesh node placement manual for introducing the principle of Mesh node placement, for example, according to which, the Mesh node should be placed upright (in a lying posture or in other postures) to ensure that the router is in a relatively open location and is not obstructed by other obstacles; and a thick wall cannot be located between Mesh routers which are optimally located within visual fields of each other. After placing the Mesh routers according to the manual, the user may not know whether the network quality of the obtained network is good, or whether there is possibility for quality improvement A first embodiment of the present application relates to a method for evaluating network quality, and the flowchart thereof includes steps 101 to 103 as shown in FIG. 1.

At step 101, a target network topology is generated according to node information in a current network. The target network topology is a network topology structure in which a master node is directly connected to each sub node.

At step 102, a network transmission cost of the target network topology is determined as a first network transmission cost, and a network transmission cost of an actual network topology is determined as a second network transmission cost, according to the node information in the current network, the target network topology and the actual network topology of the current network.

At step 103, a quality evaluation result of the current network is determined according to the first network transmission cost and the second network transmission cost.

In the embodiment of the present application, the target network topology is generated according to the node information in the current network, and the target network topology is a structure in which the sub node is directly connected to the master node. In the target network topology, each sub node has a shortest distance from the master node, the spent duration for data transmission in the target network is the shortest, and the network transmission cost of the target network topology is a network transmission cost in an ideal state. The network transmission cost of the target network topology is taken as a network transmission cost standard for measuring the actual network topology, and then the quality evaluation result of the current network may be accurately quantified, such that the determined quality evaluation result of the current network is accurate, so as to assist the user to adjust the network with poor network quality, thereby enhancing the network quality of the network and use experience for the user.

Figure 2:
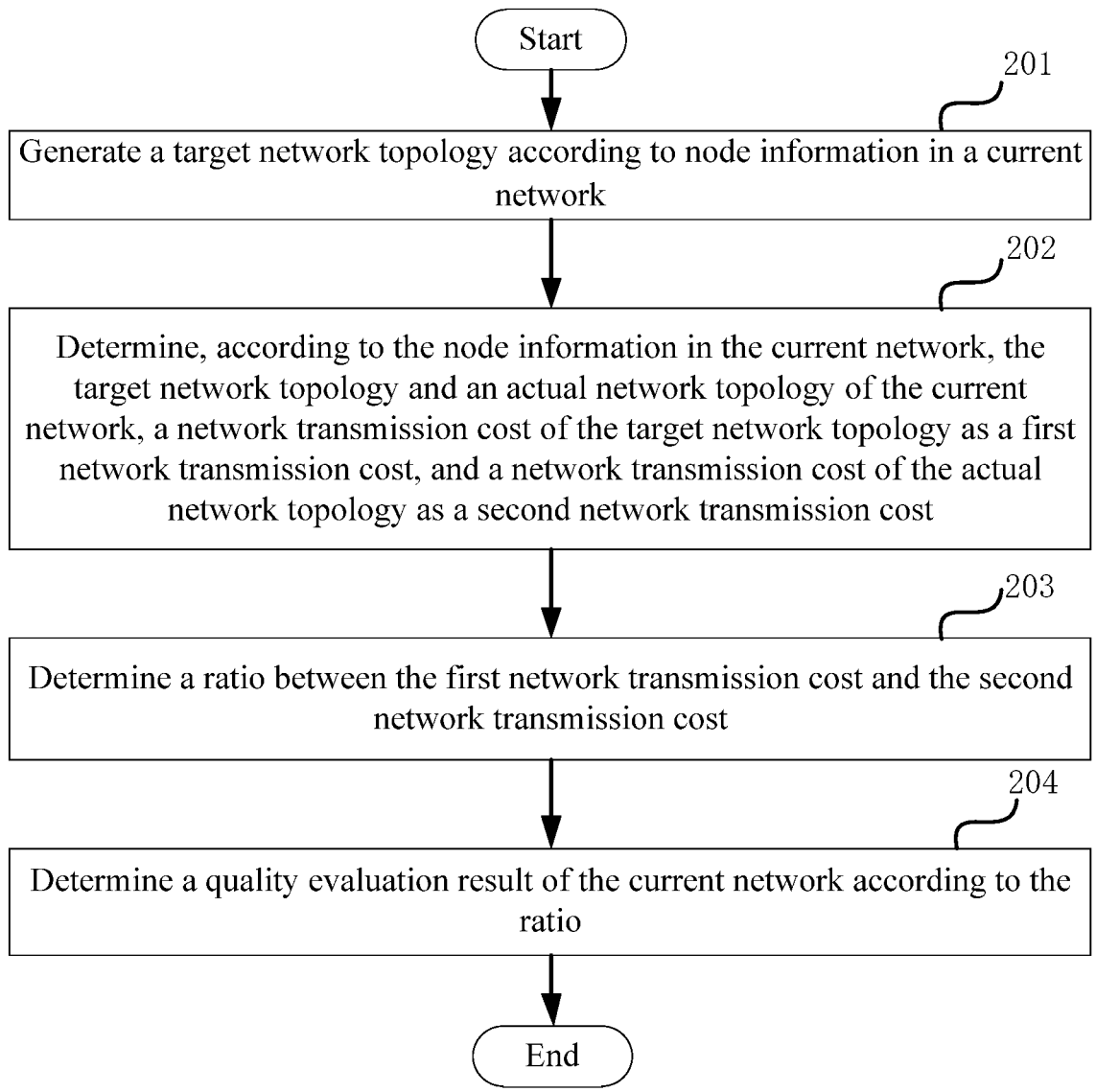
FIG. 2 is a flowchart of a method for evaluating network quality provided according to a second embodiment of the present application.

A second embodiment of the present application relates to a method for evaluating network quality, and the flowchart thereof includes steps 201 to 204 as shown in FIG. 2. The method for evaluating network quality may be applied to electronic devices, such as computers, servers, and the like.

For a better understanding of the method for evaluating network quality in this example, the Mesh network will be first illustrated as follows.

Figure 3:
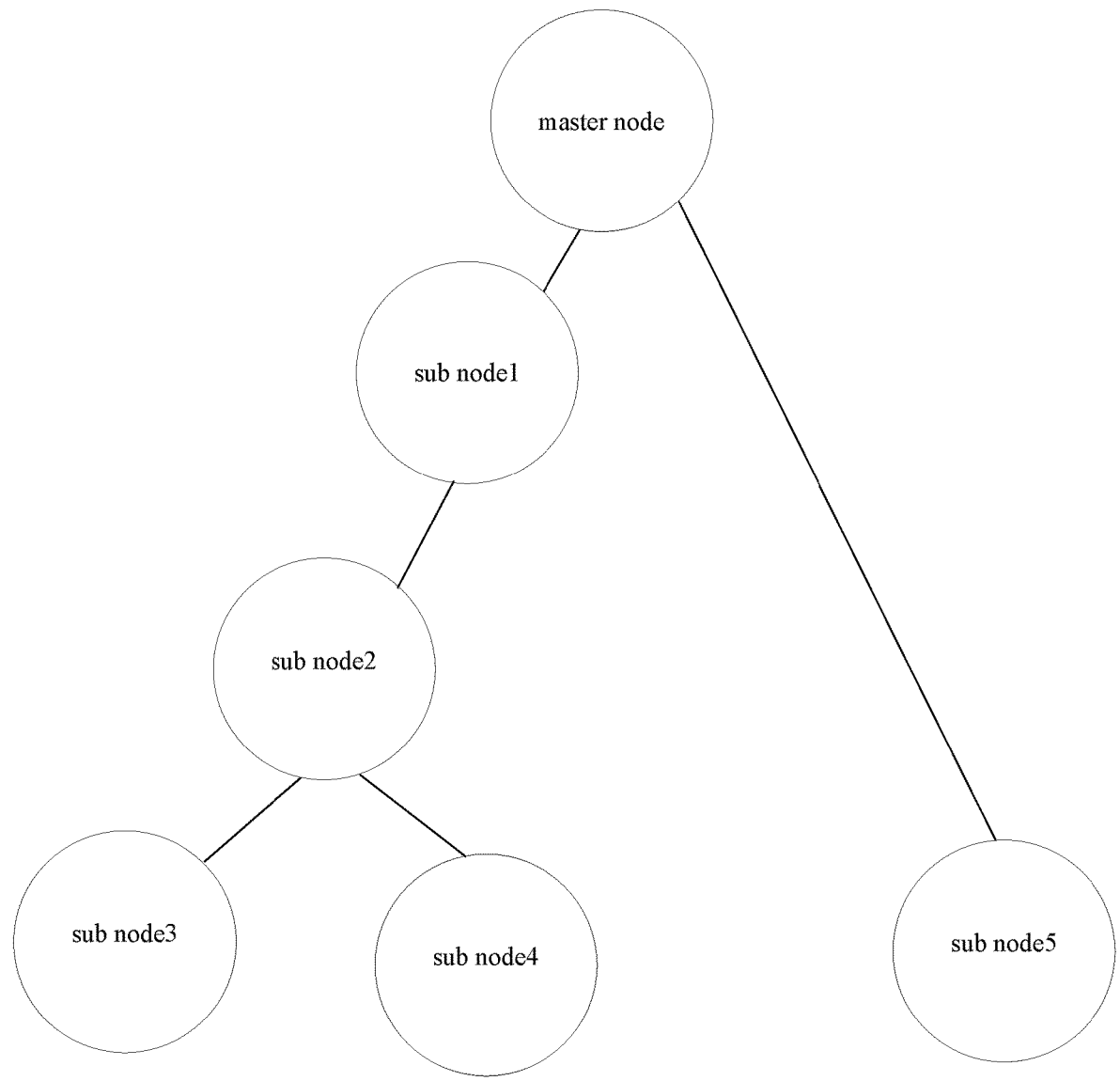
FIG. 3 is a diagram of a structure of a network topology of a current network in the method for evaluating network quality provided according to the second embodiment of the present application.

The Mesh network is a network formed by interconnecting a plurality of routers with networking function. After Mesh networking, the user may obtain a network topology of the current network, as shown in FIG. 3. Generally, an inverted-tree structure is adopted in the network topology of the Mesh network. In this tree structure, the root of the tree is not only an output of the entire Mesh network, but also a control node of the network. Several Mesh routers as first-layer nodes may be connected to the root of the tree at the beneath of the root, and second-layer nodes may be connected to the first-layer nodes at the beneath of the first-layer nodes. All the access devices (e.g., mobile phones, PCs, etc.) are connected to these sub nodes at the beneath of the sub nodes. As the user moves, the user's terminal may roam in the entire Mesh network. The individual Mesh routers may connected to each other through a wired or wireless connection. The connection medium between the individual Mesh routers and the connection mode for the Mesh routers, have great influence on the network quality of the entire network.

Generally, the farther the distance between the sub node and the master node is, the greater a maximum performance loss thereof is. As shown in FIG. 3, a sub node 3 and a sub node 4 are located farthest from the master node, and then the journey for transmitting information to the sub nodes 3 and 4 is longer and the maximum performance loss is accordingly larger. The overall maximum transmission capability is determined by the sub node with the weakest path capability in the entire Mesh network. Generally speaking, the wired connection is more stable than the wireless connection; whereas in the wireless connection, 5G has a larger capacity than 2.4G, but the large capacity transmission of 5G requires a more demanding environment.

At step 201, a target network topology is generated according to node information in a current network. The target network topology is a network topology structure in which a master node is directly connected to each sub node.

In an example, before the step 201 is performed, the node information in the current network may be first acquired. The acquisition may include: reacquiring the node information of each node in a case where occurrence of a node with a changed connection status is detected; or, periodically acquiring the node information of each node; or, periodically acquiring the node information of each node, and reacquiring the node information of each node, in a case where occurrence of a node with a changed connection status is detected.

In some instances, in the Mesh network, the electronic device may be connected to the master node, and then the node information of each node may be periodically acquired by the electronic device through the master node. The master node may be controlled to inquire whether there is a node whose connection status has changed. If there is a node whose connection status has changed, the node information of each node will be reacquired. For example, if a new node is inquired, the node information of each node may be reacquired. The node information of each node may alternatively be periodically acquired, and at the same time, whether there is a node whose connection state has changed may also be detected.

The node information is used to represent the transmission capability of the node, and may include channel usage information at the location of the node and network transmission information of the node. The channel usage information at the location of the node may include, for example, identification information of the node, identification information of the channel occupied by the node, occupancy rate for the used channel, etc. The network transmission information of the node may include: capability information of the node, connection information of the node, etc. The capability information is information used to represent the inherent capability of the node. For example, the capability information of the node may include the identification information of the node, a frequency band medium supported by the node, and a maximum physical rate over each frequency band supported by the node. The connection information may include the identification information of the node, uplink node identification information of the node, uplink connection bandwidth of the node, uplink connection signal strength of the node, etc.

In some instances, the nodes may support both wired connection and wireless connection, each having its theoretically maximum transmission rate over each medium. The identification information of the node may be an MAC address of the network card of the node, or other identification. The frequency band medium supported by the node includes: 2.4G/5G, and wired medium. The acquired capability information of the node includes: for example, a node N supporting transmission of 2.4G, 5G and wire, and the capability information may be expressed as:

```
{
    Node: nodeId,
    Capability: {
        {mac1:2.4G, 300M},
        {mac2:5G, 866M},
        {mac3,ETH, 1000M}
    }
}
``` where the Node:nodeId represents the identification of the node; the content in the Capability represents the medium information supported by the node and the theoretically maximum transmission rate under each medium. When the node address is mac1, the 2.4G frequency band is supported accordingly, and the theoretically maximum transmission rate under the 2.4G frequency band is 300M.

The connection information of the node may be expressed in the following form:

```
{
    currentNode: currentNodeId,
    UpLinkNode:uplinkNodeId,
    upLinkMedia: wifi-2.4G
    upLinkRSSI: −65dbm
}
``` where the above described information represents: the identification of the current node, the identification of the uplink node, wifi connection mode for the uplink node and 2.4G frequency band for operation. The signal strength of the uplink connection of the node is −65 dbm.

The connection information may alternatively be expressed as:

```
{
    currentNode: currentNodeId,
    UpLinkNode:uplinkNodeId,
    upLinkMedia: ethernet
    upLinkRSSI: --
}
``` where the connection information represents: the identification of the current node, the identification of the uplink node, and Ethernet for connecting the node to the sub node of the uplink connection, and there is no information on the signal strength of the uplink connection, so the signal strength is not displayed.

The channel usage information of the current location of the sub node is acquired. In the following, the statistics of the channel usage rates of a node at its own locations under 2.4G and 5G are expressed as respectively:

```
{
    currentNode: currentNodeId,
    channelUsage{
        Number: 7
        Present: 65%
    }
    channelUsage{
        Number: 149
        present: 5%
    }
}
```

The above described information represents that, the usage rate of the 2.4G channel 7 at a location of the node is 65%, and the usage rate of the channel 149 is 5%. The node information of the sub node is acquired, and the above described three types of information may be saved in corresponding sets, respectively.

It should be noted that, the capability information of the node may be acquired during networking. The connection information of the node may be reacquired if occurrence of a node with a changed connection status is detected, and the channel usage information of the current location of the node may be acquired periodically.

In an example, the number of nodes in the current network may be acquired to generate the target network topology. The target network topology is a network topology in which a master node is directly connected to each sub node.

Figure 4:
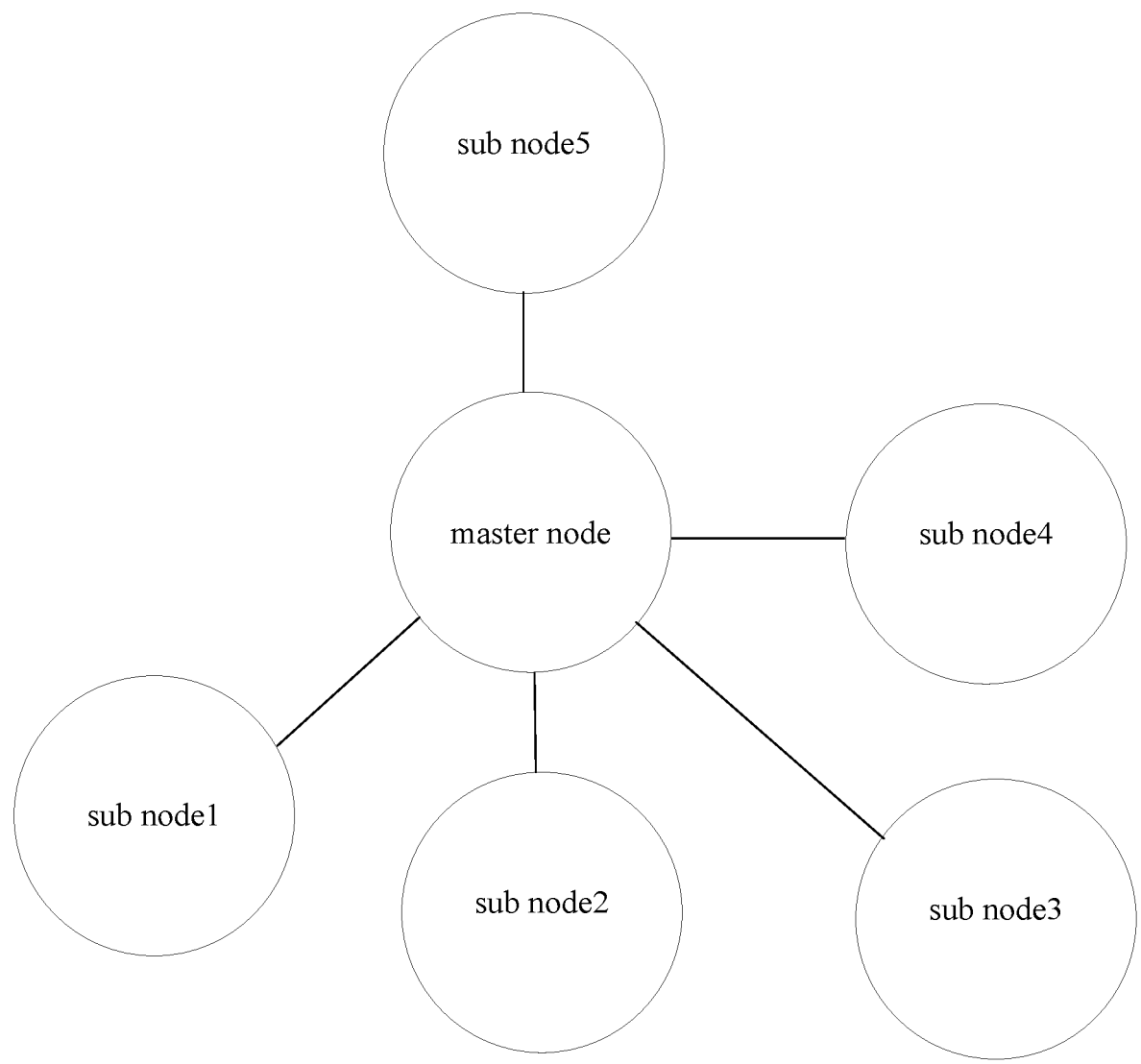
FIG. 4 is a schematic view of a target network topology in the method for evaluating network quality provided according to the second embodiment of the present application.

In some instances, the target network topology may have the following conditions including that: all the sub nodes are directly connected to the master node, there is no sub node with more than one hop, the maximum capacity of the sub nodes is used by all the medium via which all the sub nodes are connected to the master node, the signal strength is considered to be optimal, and there is no channel competition. The network topology that satisfies the above described conditions is taken as the target network topology. The diagram of a structure of the target network topology is shown in FIG. 4 in which all the sub nodes are directly connected to the master node.

It should be understood that, the number of all the sub nodes in the current network may be acquired according to the node information of each sub node, and the target network topology may be acquired according to the number of the sub nodes and the construction conditions for the target network topology. For example, if the number of the sub nodes is 5 and all the sub nodes are directly connected to the master node, the target network topology shown in FIG. 4 is obtained.

At step 202, according to the node information in the current network, the target network topology and an actual network topology of the current network, a network transmission cost of the target network topology is determined as a first network transmission cost, and a network transmission cost of the actual network topology is determined as a second network transmission cost.

Figure 5:
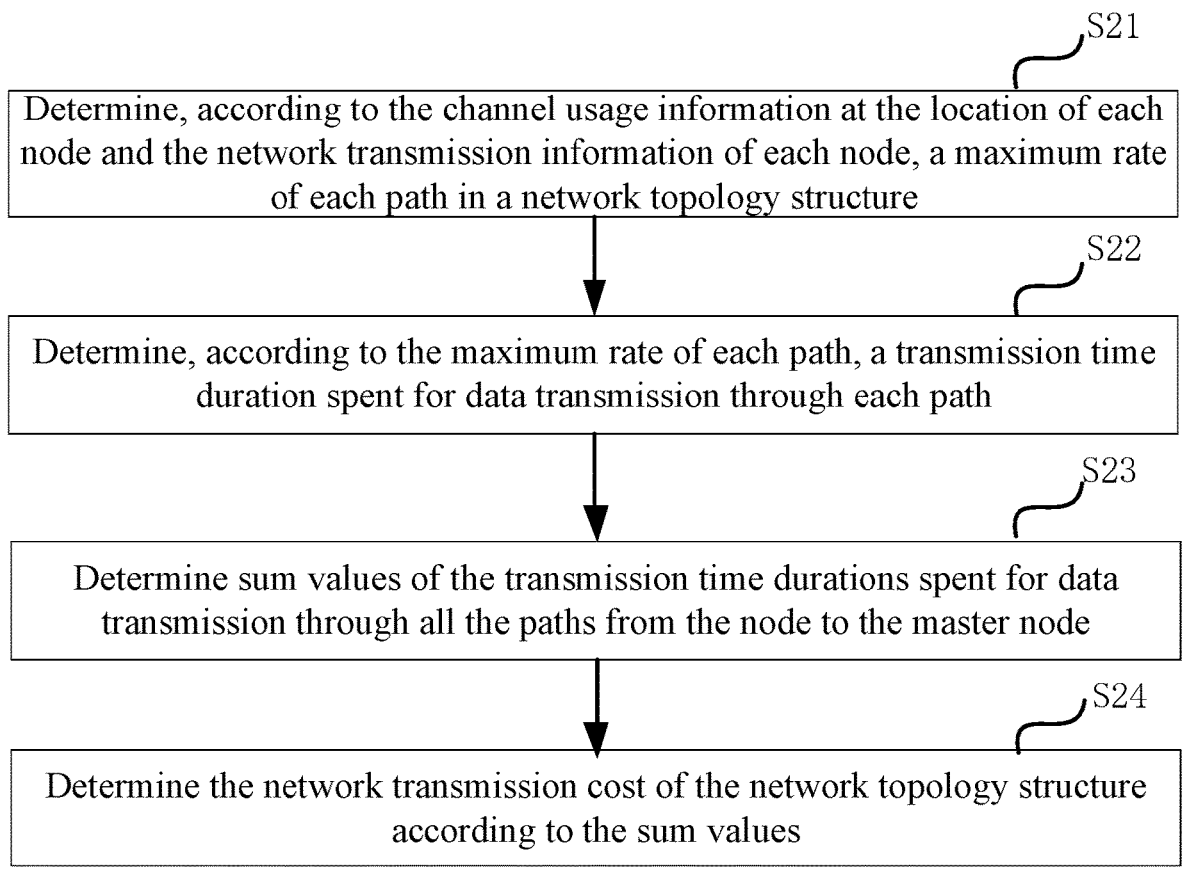
FIG. 5 is a schematic view of a specific implementation of determining a network transmission cost in the method for evaluating network quality provided according to the second embodiment of the present application.

In an example, the node information includes: channel usage information at the location of the node, and network transmission information of the node. The process of determining the first network transmission cost is similar to that of determining the second network transmission cost. The steps shown in FIG. 5 are performed for each network.

At step S21, according to the channel usage information at the location of each node and the network transmission information of each node, a maximum rate of each path in the network topology structure is determined.

In some instances, the channel usage information at the location of the node includes: channel strength of a channel at the location of the node, and the network transmission information of the node includes: signal strength of the node.

Figure 6:
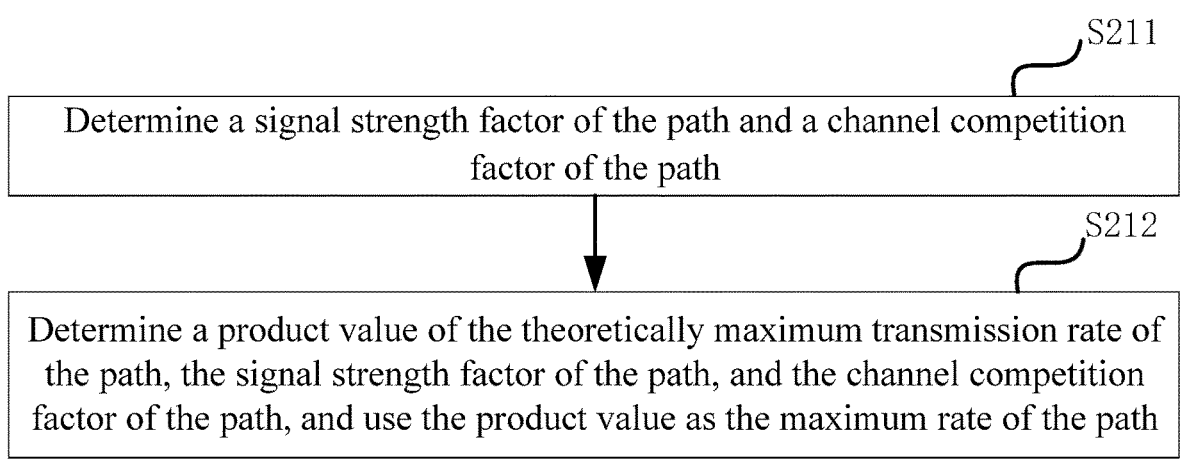
FIG. 6 is a schematic view of a specific implementation of determining a maximum rate of each path in the method for evaluating network quality provided according to the second embodiment of the present application.

In an example, the steps shown in FIG. 6 may be used to determine the maximum rate of each path.

At step S211, a signal strength factor of the path and a channel competition factor of the path are determined. The signal strength factor is used to indicate the influence of the signal strength of the node in the path on the transmission rate, and the channel competition factor is used to indicate the influence of the channel competition in the path on the transmission rate.

In some instances, the influence of the signal strength on the transmission rate may be tested in advance on site or in a laboratory to obtain a correspondence relationship between the signal strength and the transmission rate. The correspondence relationship may be measured by a remote experiment. The factors that affect the signal strength factor may be distance, obscureness from the objects, environmental noise interference, etc. The signal strength factor may be a percentage of an achievable rate at the current signal strength relative to a theoretically maximum transmission rate, and the signal strength factor may be represented as SF.

Wireless data transmission is based on channel competition. When transmission and reception are performed by multiple terminals in a same channel, the channel is generally used in turn, resulting in that the node cannot exert its maximum transmission capability. The closer the distance between the nodes is, the greater the influence due to channel competition will be; and the better the isolation between the nodes is, the smaller the influence due to channel competition will be. It should be noted that, the competition occurs in the same channel, and there is no channel competition between different channels. For example, there is no channel competition between the channels of three types of medium: 2.4G medium, 5G medium and wired medium. The channel competition factor represents the percentage of an achievable rate under the current channel condition relative to a theoretically maximum transmission rate, and the channel competition factor is recorded as CF (channel Factor). The co-channel interference data may be obtained through experiments in advance.

Each path may include multiple nodes, and the signal strength factor and the channel competition factor in the path where the nodes are located may be calculated based on a start node or an end node in this path. The signal strength factor of the path may be obtained based on a transmission rate of the current path and an ideal maximum rate. The transmission rate of the current path is obtained according to the signal strength of the node and the pre-obtained correspondence relationship between the signal strength and the transmission rate. Similarly, the channel strength factor of the path may be obtained by acquiring the transmission rate under the channel where the current node is located and the ideal maximum rate.

At step S212, a product value is calculated by multiplying the theoretically maximum transmission rate of the path, the signal strength factor of the path, and the channel competition factor of the path; and the product value is taken as the maximum rate of the path.

The theoretically maximum transmission rate of the path is acquired; and the theoretically maximum transmission rate of the path, the signal strength factor of the path, and the channel competition factor of the path are multiplied. The maximum rate of the path may be expressed by the formula (1):

$$V_{i,j}=V_{max} \times SF_{i,j} \times CF_{i,j} \quad \text{Formula (1);}$$

where $V_{i,j}$ represents the maximum rate of the path where a sub node j and a sub node i are located; $SF_{i,j}$ represents the signal strength factor of the path where the sub node j and the sub node i are located ($0<SF_{i,j}<1$); $CF_{i,j}$ represents the channel competition factor of the path where the sub node j and the sub node i are located ($0<CF_{i,j}<1$); and $V_{max}$ represents the theoretically maximum transmission rate of the path where the sub node j and the sub node i are located.

At step S22, according to the maximum rate of each path, a transmission duration spent for data transmission through each path is determined.

In an example, a reciprocal of the maximum rate of each path is taken as the duration spent of the path; or a product of the duration spent of each path and a medium competition factor is taken as the transmission duration of the path. The medium competition factor is used to indicate the intensity degree of channel competition between the path and other paths over a transmission medium.

In some instances, each path may include multiple path segments therein, and each path segment includes only two nodes. If a path includes two path segments, the frequency band for a first path segment is 2.4G and a second path segment adopts the wired connection, the transmission duration of this path is not the sum of the transmission duration of the first path segment and the transmission duration of the second path segment. Instead, a longer transmission duration selected from the transmission durations of the two path segments is taken as the transmission duration of this path. Since there is no medium competition between 2.4G transmission and the wired transmission, transmission and reception may be achieved at the same time by the 2.4G transmission and the wired transmission. In order to accurately determine the transmission duration of the path, a corresponding medium competition factor may be set for each path segment. The medium competition factor may be set in a range of 0-1; and the medium competition factor may be set according to an actual connection. For example, a larger medium competition factor may be set for a path with large competition relationship, and a smaller medium competition factor may be set for a path without channel competition. The medium competition factor may be recorded as $M_{i,j}$ ($0<M_{i,j}<1$).

The duration spent of each path may be expressed by the formula (2):

$$T_{i,j}=1/V_{i,j} \quad \text{Formula (2);}$$

and thus, the transmission duration $P_{i,j}$ of this path may be expressed by the formula (3):

$$P_{i,j}=T_{i,j} \times M_{i,j} \quad \text{Formula (3);}$$

At step S23, a sum value of the transmission durations spent for data transmission through all the paths from the node to the master node, is determined.

The sum value of the transmission durations spent for data transmission through all the paths from a node m to the master node is calculated, as expressed by the formula (4):

$$P_m = \sum_{i=1}^{n} T_{i,j+1} M_{i,j+1}; \quad \text{Formula (4)}$$

where $P_m$ represents the sum value of the transmission durations spent for data transmission through all the paths from the node m to the master node.

At step S24, the network transmission cost of the network topology is determined according to each sum value.

The sum values of all the sub nodes are added as the network transmission cost of the entire network, and the network cost N of the network topology is expressed as:

$$N = \sum_{i=1}^{M-1} P_i; \qquad \text{Formula (5)}$$

where N represents the network transmission cost of the entire network, $P_i$ represents the sum value of the transmission durations spent for data transmission through all the paths from an i-th node to the master node, and M represents the number of the nodes in the entire network.

The network transmission cost of the target network topology and the network transmission cost of the actual network topology are calculated according to the method of determining the network transmission cost, respectively. The network transmission cost of the target network topology is taken as a first network transmission cost, and the network transmission cost of the actual network topology is taken as a second network transmission cost.

At step 203, a ratio between the first network transmission cost and the second network transmission cost is determined.

In some instances, the ratio between the first network transmission cost and the second network transmission cost is calculated, and the ratio may be as expressed by the formula (6):

$$\text{Score} = N_{min}/N_{current} \qquad \text{Formula (6);}$$

where $N_{min}$ represents the first network transmission cost, $N_{current}$ represents the second network transmission cost, and Score represents the ratio.

At step 204, a quality evaluation result of the current network is determined according to the ratio.

In some instances, the quality evaluation result may include the ratio. The quality evaluation result may further include a quality level. At least two network quality levels may be preset, and a corresponding ratio range may be set for each of the network quality levels. After the ratio between the first network transmission cost and the second network transmission cost is determined, the ratio is compared with the ratio range corresponding to each of the levels, and then the network quality level of the current network may be determined.

It should be understood that, the quality evaluation result of the current network may be fed back to the user, for example, the quality evaluation result may be displayed, or the quality evaluation result may be played.

According to the technical solution provided by this embodiment, the transmission duration of each path may be acquired based on the signal strength of the node and the channel competition of the path where the node is located, so that the determined transmission duration is accurate and in turn the network transmission cost may be determined accurately.

Figure 7:
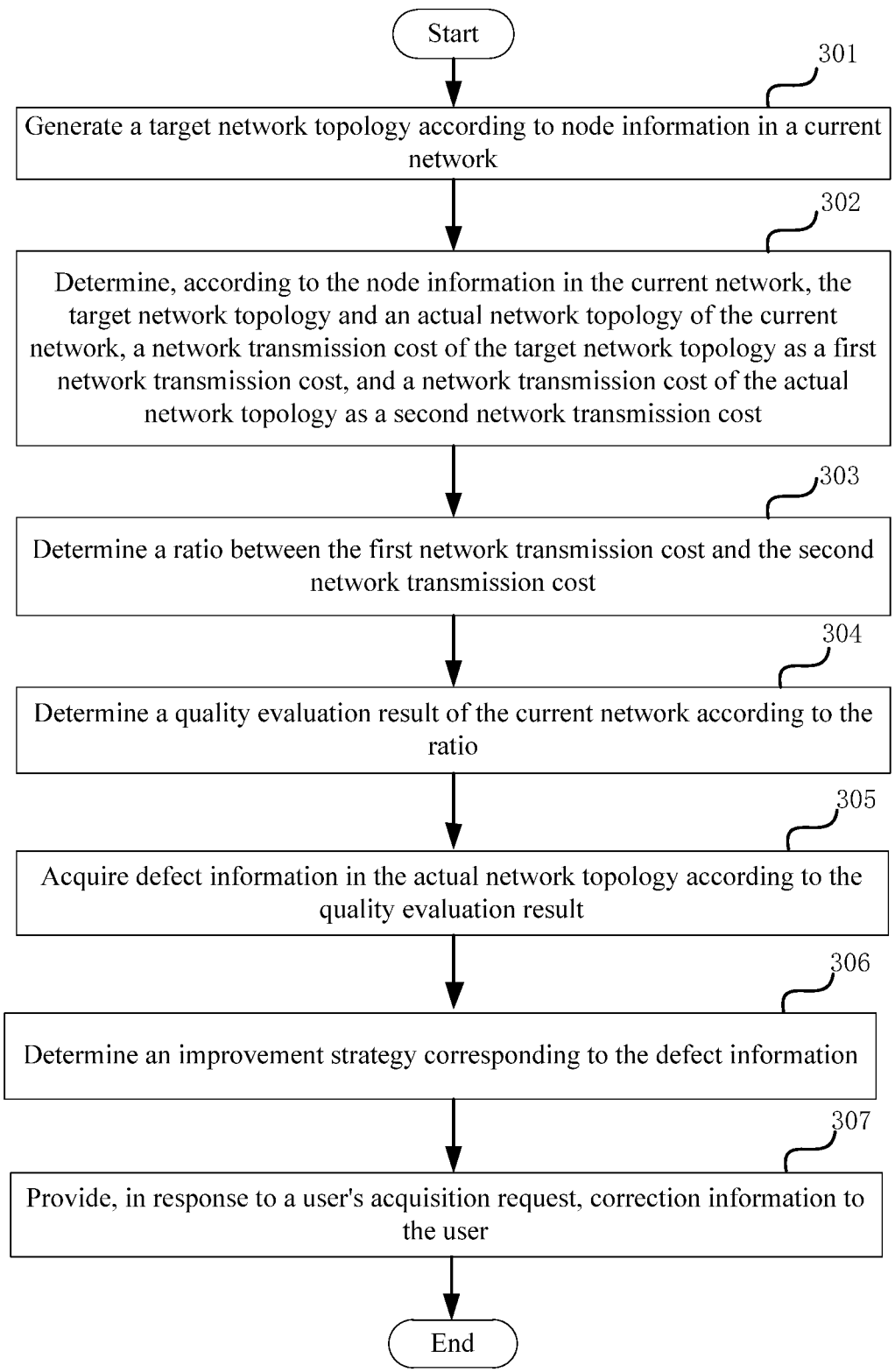
FIG. 7 is a flowchart of a method for evaluating network quality provided according to a third embodiment of the present application.

A third embodiment of the present application relates to a method for evaluating network quality. The third embodiment is a further improvement of the second embodiment. In this embodiment, after the quality evaluation result of the current network is determined, defect information of the actual network topology is acquired, and the flowchart thereof include steps 301 to 307 as shown in FIG. 7.

At step 301, a target network topology is generated according to node information in a current network.

At step 302, according to the node information in the current network, the target network topology and an actual network topology of the current network, a network transmission cost of the target network topology is determined as a first network transmission cost, and a network transmission cost of the actual network topology is determined as a second network transmission cost.

At step 303, a ratio between the first network transmission cost and the second network transmission cost is determined.

At step 304, a quality evaluation result of the current network is determined according to the ratio.

The steps 301 to 304 are substantially the same as the steps 201 to 204 in the second embodiment, and the description thereof will not be repeated herein.

At step 305, defect information in the actual network topology is acquired according to the quality evaluation result.

In an example, the quality evaluation result may further include intermediate values obtained in the process of calculating the second network transmission cost, for example, the channel competition factor of each path, the signal strength factor of each path, the theoretically maximum transmission rate of each node, etc.

The following steps are performed for each path in the actual network topology: judging whether the signal strength factor of the path is less than a first preset threshold, and if so, a first result indicating that the path has a signal defect; judging whether the channel competition factor of the path is less than a second preset threshold, and if so, a second result indicating that the path has a channel competition defect; judging whether the number of nodes in the path is greater than a third preset threshold, and if so, a third result indicating that the path has a transmission distance defect; comparing the theoretically maximum transmission rates of individual nodes in the path, and marking the node corresponding to a smallest theoretically maximum transmission rate, then a fourth result indicating that the marked node in the path has a performance defect; and generating the defect information according to the first result, the second result, the third result and the fourth result All of the first preset threshold, the second preset threshold and the third preset threshold may be set according to actual applications. For example, the first preset threshold may be set to 0.5, the second preset threshold may be set to 0.5, and the third preset threshold may be set to 3. When the signal strength factor is less than the first preset threshold of 0.5, it indicates that the signal of the path where the current node is located is poor, and there is a signal defect in this path, for example, there are problems of path obscuration, unreasonable antenna orientation, etc. If the channel competition factor is less than the second preset threshold of 0.5, it indicates that the channel competition of the path where the current node is located is fierce, and there is a channel competition defect. If the number of nodes in the path is greater than the third preset threshold, it indicates that the current path is relatively long. For example, a path where node 1 to node 4 are located includes node 1, node 2, node 3 and node 4, and the number of the nodes is greater than the third preset threshold, that is, the number of the nodes n>3. It indicates that there is a transmission distance defect. If the number of the nodes is greater than 3, and the channel competition factor of this path is greater than 0.5, it indicates that there is interference in the path. If the theoretically maximum transmission rates of individual nodes in the path are compared, and the node corresponding to the smallest theoretically maximum transmission rate is marked, the fourth result indicates that the marked node of the path has a performance defect.

The defect information may be generated based on the first result, the second result, the third result and the fourth result.

At step 306, an improvement strategy corresponding to the defect information is determined.

In an example, if the defect information includes the signal defect, determining the improvement strategy includes: changing the used frequency band of a node in the path; if the defect information includes the channel competition defect, determining the improvement strategy includes: switching a transmission channel of a node in the path; if the defect information includes the transmission distance defect determining the improvement strategy includes: moving the position of a node in the path, such that a first distance between the node and the master node is smaller than a second distance between the current node and the master node; and if the defect information includes the node performance, determining the improvement strategy includes: removing the marked node, e defect.

Figure 8:
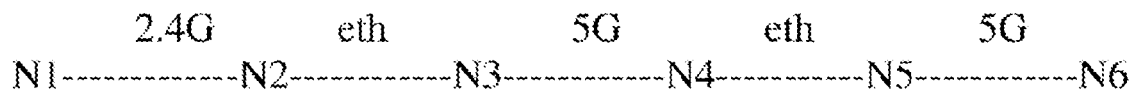
FIG. 8 is a schematic view of one path in the method for evaluating network quality provided according to the third embodiment of the present application.

In some instances, if the defect information includes the signal defect, the used frequency band of the node is changed. For example, if a 5G frequency band is used as the connection medium and there is a signal defect, the used frequency band may be changed to 2.4G. If the defect information includes the channel competition defect, determining the improvement strategy includes: switching the transmission channel of the node, e.g., switching to a less busy channel. If the defect information includes the transmission distance defect, determining the improvement strategy includes: moving the position of the node in the path, such that the first distance between the node and the master node is smaller than the second distance between the current node and the master node, e.g., shortening the length of the path, i.e., reducing the number of nodes in the path; and the medium of individual path segments may be staggered and separated, as shown in FIG. 8. It should be noted that, each path contains multiple path segments, and each path segment includes two nodes: an upper node and a lower node. In FIG. 8, the path includes 6 nodes and 5 path segments. A 2.4G medium is used between node N1 and node N2, an Ethernet cable is used between node N2 and node N3, a 5G medium is used between node N3 and node N4, an Ethernet cable is used between node N4 and node N5, and a 5G medium is used between node N5 and node N6.

Figure 9:
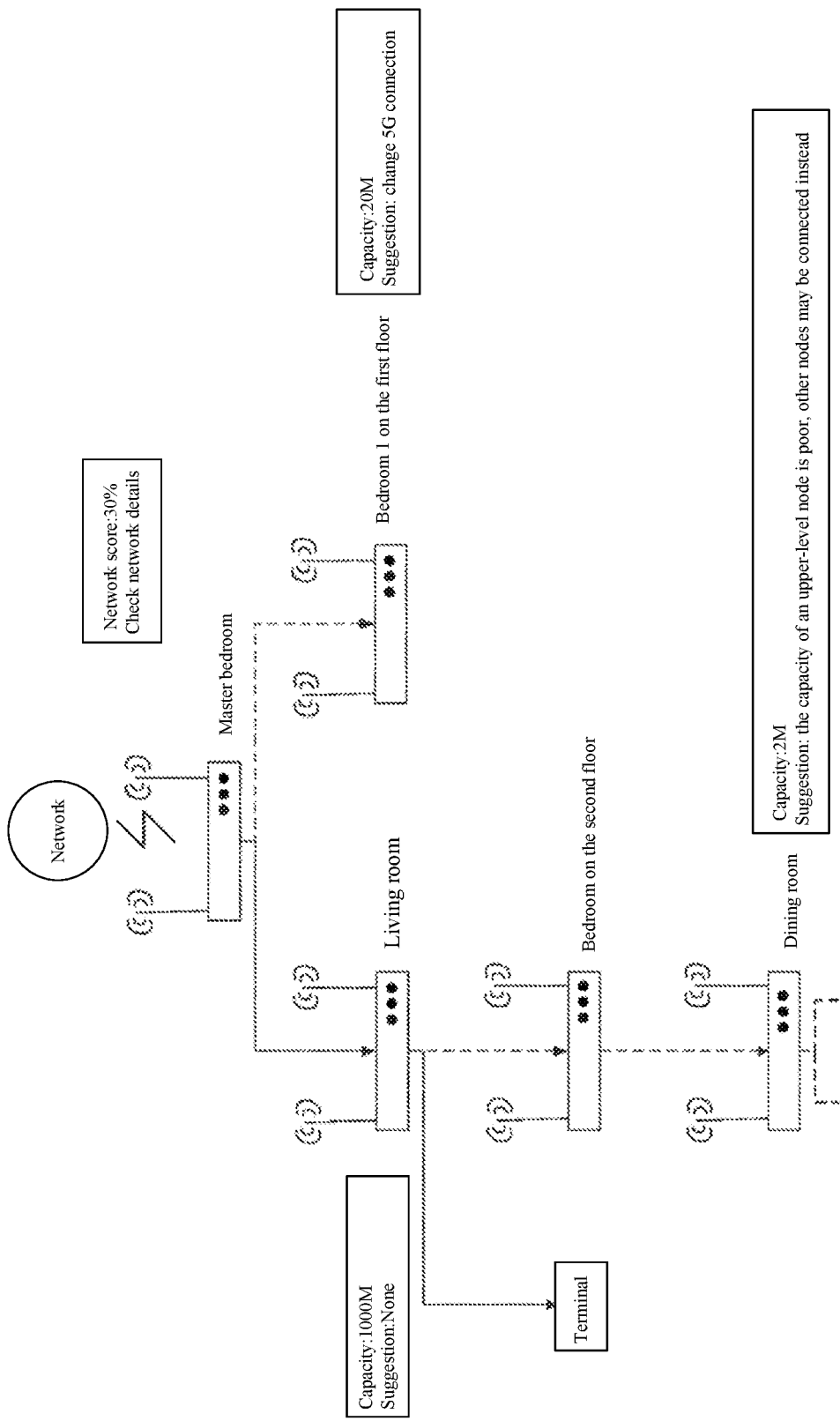
FIG. 9 is a schematic view of a display interface in the method for evaluating network quality provided according to the third embodiment of the present application.

It should be understood that, the quality evaluation result of the current network and the acquired defect information may be displayed to the user in the form of an interface. In this example, the interface shown in FIG. 9 may be used, but other interfaces may also be used for display. In FIG. 9, the network score of the current network is displayed as 30%; and the interface also displays the network topology structure of the current network. In the interface, the solid line represents the use of a wired connection mode, and the dashed line represents the use of a wireless connection mode.

At step 307, in response to a user's acquisition request, correction information is provided to the user to correct the actual network topology by the user.

The correction information includes the defect information; or, the correction information includes the improvement strategy; or, the correction information includes the defect information and the improvement strategy. For example, after the user initiates an acquisition request via the interface, the defect information may be displayed on the interface; or the improvement strategy may be displayed on the interface, or both the display information and the improvement strategy may be displayed on the interface. It should be understood that, if the improvement strategy is provided, a mode for selecting the improvement strategy may be further provided for the user, such as clicking a control or an input control, and the like.

In an example, in response to the improvement strategy selected by the user, the actual network topology is updated according to the selected improvement strategy; or, in response to the user's operation of moving the node, a re-networking request initiated by the node is received, and then the actual network topology is updated.

The user may select the improvement strategy on the displayed interface. For example, if defect information is displayed on the display interface, the display interface provides a trigger control. After the user clicks the trigger control, the improvement strategy corresponding to the defect information is displayed, as shown in Table 1:

TABLE 1

| Sub node | Path length | Maximum rate | Defect information | Improvement strategy |
|---|---|---|---|---|
| Sub node 1 | 1 | 500M | None | None |
| Sub node 2 | 2 | 100M | Channel congestion | Switching the channel |
| Sub node 3 | 3 | 20M | The node being far away from the master node, and the node itself having a low capacity | Moving the node |
| ... | | | | |

The user may select an improvement strategy as required, and in response to the improvement strategy selected by the user, the actual network topology is updated according to the selected improvement strategy. The actual network topology may be updated automatically, or the channel of the node may be automatically adjusted, etc. The user may move the node according to the guidance of the improvement strategy. The electronic device acquires the user's operation of moving the node, receives the re-networking request initiated by the node, and updates the actual network topology. For example, as shown in FIG. 9, the user may manually move the node at the bedroom on the second floor to the bedroom 1 on the first floor, and then directly hang the node at the dining room to the bedroom 1 on the first floor. After the dragging and dropping, the master node will send a re-networking message to the node at the "dining room", disconnect from the original node at the bedroom on the second floor, and connect to the target node at the bedroom 1 on the first floor.

After the actual network topology is updated, the quality evaluation result of the updated actual network topology is determined, provided, and displayed.

According to the technical solution provided by this embodiment, the defect information of the current network may be acquired according to the quality evaluation result of the current network, and an improvement strategy specific to the defect information may be determined, thereby assisting the user to correct the current network according to the improvement strategy, so as to improve the network quality of the network and improve the use experience of the user.

Figure 10:
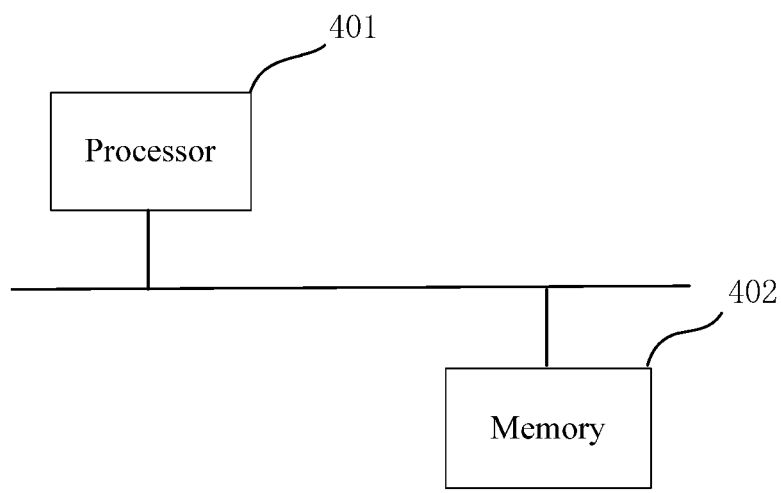
FIG. 10 is a block diagram of a structure of an electronic device provided according to a fourth embodiment of the present application.

The fourth embodiment of the present application relates to an electronic device, as shown in FIG. 10, including: at least one processor 401 and a memory 402 in communication connection with the at least one processor 401. The memory 402 stores instructions executable by the at least one processor 401, and the instructions are executed by the at least one processor 401 to enable the at least one processor 401 to perform the method for evaluating network quality.

The memory and the processor are connected to each other by buses, the buses may include any number of interconnected buses and bridges, and the buses connect various circuits of one or more processors and of the memory together. The buses may also connect various other circuits together, such as the circuits of peripheral devices, voltage regulators, and power management circuits, etc., which are well known in the art and thus will not be further described herein. A bus interface is provided between the bus and a transceiver. The transceiver may be a single element or may include multiple elements, such as multiple receivers and transmitters, so as to provide a unit for communicating with various other devices over a transmission medium. The data processed by the processor is transmitted over the wireless medium via an antenna, and further, the antenna also receives data and transmits the data to the processor.

The processor is responsible for managing the buses and performing general processing, and may also provide various functions, including timing, peripheral interfacing, voltage regulation, power management, and other control functions. The memory may be used to store data used by the processor when performing operations.

A fifth embodiment of the present application relates to a computer-readable storage medium in which a computer program is stored. When the computer program is executed by the processor, the method for evaluating the network quality in the above-described method embodiments is implemented.

That is, it should be understood by those skilled in the art that, all or a part of the steps for implementing the methods of above described embodiments may be achieved by a program which instructs relevant hardware, and the program is stored in a storage medium and includes several instructions that are configured to allow a device (which may be a single chip microcomputer, a chip, etc.) or a processor to perform all or a part of the steps of the methods described in the various embodiments of the present application. The aforementioned storage medium includes various mediums that can store program codes, such as a U disk, a mobile hard disk, a Read-Only Memory (ROM), a Random Access Memory (RAM), a magnetic disk, an optical disk, etc. The computer-readable storage medium includes a transitory or non-transitory, removable or non-removable medium implemented in any method or technology for storage of information (such as computer readable instructions, data structures, computer program modules or other data).

It should be understood by those of ordinary skill in the art that, the above described embodiments are specific embodiments for realizing the present application, and in practical applications, various modifications in forms and details can be made without departing from the spirit and the scope of the present application.

The invention claimed is:

1. A method for evaluating network quality, comprising:
generating a target network topology according to node information in a current network, the target network topology being a network topology structure in which a master node is directly connected to each sub node, wherein the node information comprises: channel usage information at a location of a node and network transmission information of the node, wherein the channel usage information at the location of the node comprises channel strength of a channel where the node is located, and the network transmission information of the node comprises signal strength of the node;
determining a network transmission cost of the target network topology as a first network transmission cost and a network transmission cost of the actual network topology as a second network transmission cost, according to the node information in the current network, the target network topology and an actual network topology of the current network comprises:
for each network topology, determining a maximum rate of each path in the network topology structure according to the channel usage information at the location of each node and the network transmission information of each node, comprises;
determining a signal strength factor of the path and a channel competition factor of the path, wherein the signal strength factor is used to indicate influence degree of the signal strength of the node in the path on the transmission rate, and the channel competition factor is used to indicate the influence degree of the channel competition in the path on the transmission rate; and
determining, a product value by multiplying a theoretically maximum transmission rate of the path, the signal strength factor of the path, and the channel competition factor of the path, as the maximum rate of the path; and
determining a quality evaluation result of the current network according to the first network transmission cost and the second network transmission cost.

2. The method for evaluating network quality according to claim 1, further comprising:
acquiring defect information in the actual network topology according to the quality evaluation result;
determining an improvement strategy corresponding to the defect information; and
providing, in response to a user's acquisition request, correction information to the user to correct the actual network topology;
wherein the correction information comprises the defect information; or, the correction information comprises the improvement strategy; or, the correction information comprises the defect information and the improvement strategy.

3. The method for evaluating network quality according to claim 2, wherein
the quality evaluation result comprises: a channel competition factor of each path and a signal strength factor of each path;
acquiring defect information in the actual network topology according to the quality evaluation result comprises performing a process, for each path of the actual network topology, as follows:
judging whether the signal strength factor of the path is less than a first preset threshold, and in a case where the signal strength factor of the path is less than a first preset threshold, a first result indicating that the path has a signal defect;
judging whether the channel competition factor of the path is less than a second preset threshold, and in a case where the channel competition factor of the path is less than a second preset threshold, a second result indicating that the path has a channel competition defect;
judging whether the number of nodes in the path is greater than a third preset threshold, and in a case where the number of nodes in the path is greater than a third preset threshold, a third result indicating that the path has a transmission distance defect;
comparing theoretically maximum transmission rates of individual nodes in the path, and marking the node corresponding to a smallest theoretically maximum transmission rate, then a fourth result indicating that a marked node in the path has a performance defect; and
generating the defect information according to the first result, the second result, the third result and the fourth result.

4. The method for evaluating network quality according to claim 2, wherein
determining the improvement strategy corresponding to the defect information comprises:
in a case where the defect information comprises the signal defect, determining the improvement strategy comprising: changing a used frequency band of a node in the path;
in a case where the defect information comprises the channel competition defect, determining the improvement strategy comprising: switching a transmission channel of a node in the path;
in a case where the defect information comprises the transmission distance defect, determining the improvement strategy comprising: moving a position of a node in the path, such that a first distance between the node and the master node is smaller than a second distance between the current node and the master node; and
in a case where the defect information comprises the node performance defect, determining the improvement strategy comprising: removing the marked node.

5. The method for evaluating network quality according to claim 2, further comprising:
updating, in response to the improvement strategy selected by the user, the actual network topology according to a selected improvement strategy; or
receiving, in response to the user's operation of moving the node, a re-networking request initiated by the node, and updating the actual network topology.

6. The method for evaluating network quality according to claim 5, wherein
after updating the actual network topology, the method further comprises:
determining and providing a quality evaluation result of an updated actual network topology.

7. The method for evaluating network quality according to claim 1, wherein
determining the quality evaluation result of the current network according to the first network transmission cost and the second network transmission cost comprises:
determining a ratio between the first network transmission cost and the second network transmission cost; and
determining the quality evaluation result of the current network according to the ratio.

8. The method for evaluating network quality according to claim 1,
determining a network transmission cost of the target network topology as a first network transmission cost and a network transmission cost of the actual network topology as a second network transmission cost, according to the node information in the current network, the target network topology and an actual network topology of the current network, further comprises performing a process, for each network topology, as follows:
determining a transmission duration spent for data transmission through each path according to the maximum rate of each path;
determining sum values of transmission durations spent for data transmission through all the paths from the node to the master node; and
determining the network transmission cost of the network topology structure according to the sum values.

9. The method for evaluating network quality according to claim 1, wherein
determining the transmission duration spent for data transmission through each path according to the maximum rate of each path, comprises:
taking a reciprocal of the maximum rate of each path, as the duration spent of the path; and
taking a product of the duration spent of each path and a medium competition factor as the transmission duration of the path, wherein the medium competition factor is used to indicate the intensity degree of channel competition between the path and other paths over a transmission medium.

10. The method for evaluating network quality according to claim 1, wherein
before generating the target network topology according to node information in the current network, the method further comprises:
re-acquiring the node information of each node in a case where occurrence of a node with a changed connection state is detected; or
periodically acquiring the node information of each node; or
periodically acquiring the node information of each node, and re-acquiring the node information of each node in a case where occurrence of a node with a changed connection state is detected.

11. An electronic device, comprising:
at least one processor; and
a memory in communication connection with the at least one processor, wherein
the memory stores instructions executable by the at least one processor, and the instructions are executed by the at least one processor to enable the at least one processor to perform the method for evaluating network quality according to claim 1.

12. A non-transitory computer-readable storage medium on which a computer program is stored, wherein when the computer program is executed by a processor, the method for evaluating network quality according to claim 1.

* * * * *